Oct. 14, 1930. E. A. KANST 1,778,030
TREE IRRIGATOR
Filed April 19, 1928 2 Sheets-Sheet 2

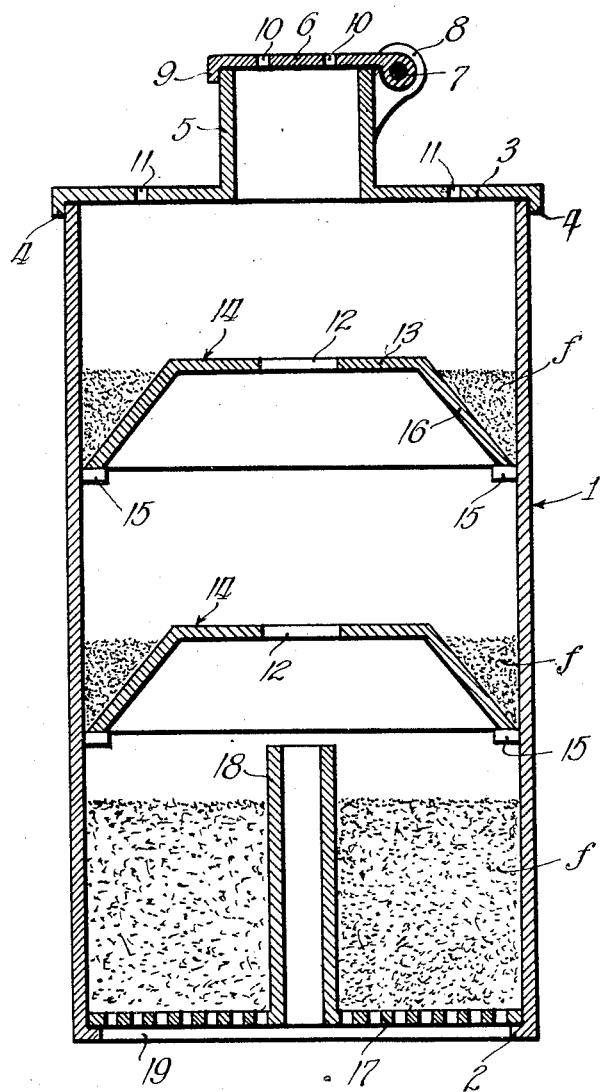

Inventor
Edwin A. Kanst
By Brown Jackson Boettcher Skinner
Atty's

Patented Oct. 14, 1930

1,778,030

UNITED STATES PATENT OFFICE

EDWIN A. KANST, OF CHICAGO, ILLINOIS

TREE IRRIGATOR

Application filed April 19, 1928. Serial No. 271,180.

This invention relates to irrigating devices, and more particularly to a device specially adapted for use in irrigating trees, shrubs and the like.

The device of my invention is intended for irrigating the root systems of trees, shrubs and other plants, and for supplying fertilizer thereto. This device is intended more particularly as an improvement over the irrigators disclosed in my Patents Nos. 1,194,027 and 1,280,486 issued to me on August 8th, 1916 and October 1st, 1918, respectively. While the devices of my patents identified have proved to be highly efficient in use, I find that, after such devices have been in use for a period of years, they are apt to become clogged with dirt and other foreign materials and also by the finer roots of the trees or shrubs which tend to pass upwardly into the body of the irrigator through the openings at the lower end thereof. To obtain the best results with an irrigating device of this character the body should be unobstructed so that the water can flow freely therethrough and carry with it the fertilizer in solution.

I have also found that it is desirable to provide means whereby a relatively large quantity of fertilizer can be supported within the body of the irrigator in such manner as to be subjected to the action of the water passing therethrough so as to supply the root systems with ample plant food, thus assuring proper growth of the trees, shrubs, or other plants in connection with which the irrigator is used.

One of the main objects of my invention is to provide a tree irrigator of simple and inexpensive construction, the various parts of which are so constructed and related as to permit ready removal of dirt, roots, and other matter which tends to clog the irrigator. A further object is to provide an irrigator of this type capable of supporting a relatively large quantity of fertilizer in such manner as to be subjected to the action of the water flowing through the irrigator. Another object is to provide a construction such that ready access may be had to the layer of crushed stone, gravel, or like material beneath the irrigator to permit ready renewal thereof when desired. Further objects and advantages of my invention will appear from the detailed description.

In the drawings:

Fig. 1 is a central vertical sectional view through an irrigator constructed in accordance with my invention.

Figure 3:
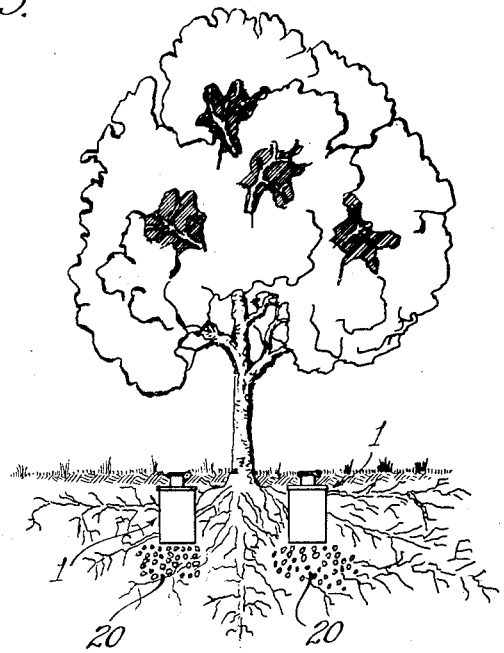
Fig. 3 is a view, partly in section, showing the manner in which my irrigator is used for irrigating a tree.
Figure 2:
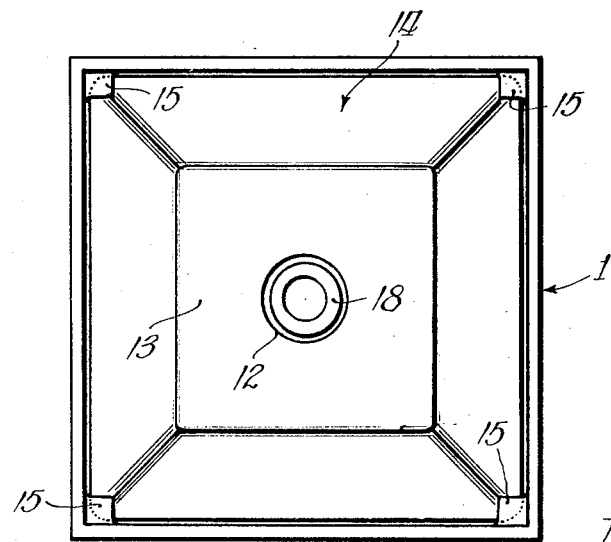
Fig. 2 is a top plan view of the irrigator, the cover and the upper baffle being removed.

My irrigator may be constructed of any suitable or preferred material and may be of any desired cross section. The word "tubular" as used in the appended claims is, therefore, intended to include any desired cross-section, such as rectangular or circular. In the particular form illustrated by way of example I have shown a body 1, which is formed of cast iron and is of rectangular cross section. This body is provided, at its lower end, with an inwardly projecting peripheral flange 2, and is closed, at its upper end, by a flat cover 3 having a depending flange 4 which fits snugly about the upper end of the body 1.

The cover 3 is provided with a central upwardly extending spout 5 which is normally closed by a suitable plate or cap 6 hingedly mounted at 7 between a pair of lugs 8 projecting from one wall of spout 5. This cap 6 is provided with a depending peripheral flange 9 which fits snugly about the upper end of the spout. The cap is further provided with suitable air openings 10, cover 3 being also provided with air openings 11.

The spout 5 is disposed in substantial alignment with an opening 12 disposed centrally of the top wall 13 of a baffle 14 which is of substantially frusto-pyramidal shape. This baffle is loosely supported within body 1 upon lugs 15 projecting inwardly from the body at the corners thereof so that, by removing the cover 3 and inserting the finger through opening 12, the baffle 14 may be readily removed from the body 1 through the upper end thereof. The side walls 16 of the baffle diverge upwardly away from the walls of body 1 leaving an upwardly flaring space for reception of a quantity of a suitable fertilizer $f$. I have shown two such upwardly tapering baffles 14. Obviously the number of baffles employed may be varied to suit conditions.

The lower baffle can be readily removed from the body through the upper end thereof by slightly tilting it so as to pass it between the lugs 15 which support the upper baffle.

Flange 2 at the lower end of the body supports a bottom plate 17 which seats upon this flange and is perforated for passage therethrough of the water and the fertilizer in solution. This plate has a central tubular post 18 which opens through the plate, the upper end of this post being open and the post extending an appreciable distance above the plate. The main body of fertilizer $f$ is supported upon this bottom plate 17 about the tubular post 18. It will be noted that the post 18 is disposed in alignment with the central openings 12 of the baffle. The flange 2 is of appreciable thickness so as to leave a space 19 beneath the plate 17 to facilitate flow of the water through this plate.

In using the irrigator a hole of suitable size and depth is dug and the lower portion of this hole is then filled with a bed or layer of suitable thickness of crushed stone, gravel or similar material indicated at 20 in Fig. 3. The irrigator is then placed in position in this hole with the cover 3 a short distance beneath the ground surface and the upper end of spout 5 substantially flush with the ground. This prevents interference with mowing of the lawn and also renders the irrigator inconspicuous.

In the use of this irrigator water is supplied to the body 1 through the spout 5 until the body is filled, or substantially so. This water will flow downwardly through the irrigator and will pass through the layer 20 of gravel or crushed stone, after which it will spread outwardly through the ground so as to effectively irrigate the root system of the tree.

In its passage through the irrigator the water dissolves a portion of the fertilizer $f$ which is applied to the root system of the tree in solution so as to be immediately available for use. In this connection, the provision of the fertilizer $f$ in the spaces between the walls of body 1 and the baffles 14 is of advantage in assuring an ample supply of fertilizer to the tree since a portion of the water will pass through the fertilizer above the baffles before entering the main mass of the fertilizer supported by the bottom plate 17, and, therefore, a relatively large amount of fertilizer will be dissolved by this water.

After the irrigator has been in use for a period of years it is apt to become clogged due to the accumulation of dirt in the body 1, and also to the growth of the smaller roots of the root system entering through the perforations of plate 17 into the body. This condition can be easily remedied by removing the cover 3, after which the baffles 14 are removed and the body 1 is then cleaned out by means of a spade or other suitable implement. In removing the cover 3, the sod can be easily cut with a spade so as to be removed with the cover without breakage or other damage to the sod, so that when the cover is replaced, the lawn is not in any way defaced. In the event that the body 1 is badly clogged due to root growth through the bottom plate 17, or if the mass 20 of crushed stone or gravel is clogged to such an extent as to interfere with ready flow of water from the irrigator, the bottom plate 17 can be removed after removal of the baffles 14. In this connection, the central post 18 provides a convenient hand-hold or grip for removing the bottom plate. After removal of the bottom plate, the body 1 can be thoroughly cleaned out, and, if found desirable or necessary, the mass of crushed stone or gravel beneath the irrigator can be removed and replaced.

After this has been done, the bottom plate and the baffles and cover are replaced and the irrigator is again in condition to assure maximum efficiency in operation. It will thus be seen that by constructing the irrigator in the manner illustrated and described, I assure a plentiful supply of fertilizer to the root system of the tree and also render it possible to quickly and easily clean out the body 1 in an effective and thorough manner when conditions require, while also rendering it possible to readily renew the crushed stone or gravel beneath the irrigator.

I claim:

1. In a tree irrigator, a tubular body adapted for insertion into the ground and having openings through its bottom, a plurality of baffle members removably supported in the body in superposed relation and removable through the upper end thereof, and a removable cover for the upper end of the body.

2. In a tree irrigator, a tubular body adapted for insertion into the ground, baffle members removably supported in the body and removable through the upper end thereof, a removable cover for the upper end of the body, and a bottom plate provided with openings and removable through the upper end of the body.

3. In a tree irrigator, a tubular body adapted for insertion into the ground and having openings through its bottom, and a plurality of upwardly tapering baffles fitting loosely within the body in superposed relation for supporting separate masses of fertilizing material.

4. In a tree irrigator, a tubular body adapted for insertion into the ground and having openings through its bottom, upwardly tapering baffles fitting loosely within the body, and a tubular post extending upwardly within the body from the bottom wall thereof and establishing communication between the interior of the body and the space beneath the body.

5. In a tree irrigator, a tubular body adapted for insertion into the ground and having an inwardly projecting flange at its lower end, a bottom plate seating upon said flange and removably supported thereby within the body, lugs projecting inwardly of the body, baffles seating on the lugs and removably supported thereby within the body, said baffles and the plate being removable through the upper end of the body, and a removable cover for the upper end of the body.

6. In a tree irrigator, a tubular body adapted for insertion into the ground and having openings through its bottom, upwardly tapering baffles fitting loosely within the body and having substantially centrally disposed openings establishing communication between the space above and the space below the respective baffles, a cover for the upper end of the body having a central filling spout, and a closure cap for the spout.

7. In a tree irrigator, a tubular body adapted for insertion into the ground, a perforate bottom plate at the lower end of the body, a central tubular post opening through the plate and into the body above the plate, upwardly tapering baffles within the body and having central openings, a cover for the upper end of the body having a central filling spout, and a closure for the spout.

In witness whereof, I hereunto subscribe my name this 16th day of April, 1928.

EDWIN A. KANST.